Jan. 12, 1965 J. W. RYAN 3,165,320

CHANGEABLE RECORD PHONOGRAPH FOR TOY FIGURES

Filed Jan. 22, 1963 5 Sheets-Sheet 1

JOHN W. RYAN
INVENTOR.

BY Albert M. Herzig

ATTORNEY

JOHN W. RYAN
INVENTOR.

BY Albert M. Herzig

ATTORNEY

CHANGEABLE RECORD PHONOGRAPH FOR TOY FIGURES

Filed Jan. 22, 1963 5 Sheets-Sheet 3

JOHN W. RYAN
INVENTOR.

BY Albert M. Herzig

ATTORNEY

CHANGEABLE RECORD PHONOGRAPH FOR TOY FIGURES

Filed Jan. 22, 1963 5 Sheets-Sheet 4

JOHN W. RYAN
INVENTOR.

BY Albert M. Herzig

ATTORNEY

Jan. 12, 1965 J. W. RYAN 3,165,320

CHANGEABLE RECORD PHONOGRAPH FOR TOY FIGURES

Filed Jan. 22, 1963 5 Sheets-Sheet 5

JOHN W. RYAN
INVENTOR.

BY Albert M. Herzig

ATTORNEY

United States Patent Office 3,165,320
Patented Jan. 12, 1965

3,165,320
CHANGEABLE RECORD PHONOGRAPH FOR TOY FIGURES

John W. Ryan, Bel Air, Calif., assignor to Mattel, Inc., Hawthorne, Calif., a corporation of California Filed Jan. 22, 1963, Ser. No. 253,192
7 Claims. (Cl. 274—2)

In general, the present invention relates to a changeable record phonograph adapted to be located in a toy figure. More specifically, the present invention relates to a changeable record phonograph adapted to securely position a record on its turntable irrespective of the orientation of said turntable by insertion from the side of the turntable and to prevent the insertion of another record when the record is positioned on said turntable.

The development and production of phonographs which are sufficiently compact, rugged and durable to be placed within toy figures has been found to be a very difficult problem because of the rough handling to which most toys are subjected by chlidren. Furthermore, such problem is complicated by the fact that phonographs for toy figures must be inexpensive and easy to manufacture so that they can be produced in large volume. To date, such problems have been solved only to the extent of a phonograph containing a single record permanently mounted thereon. An example of such phonograph is the phonograph described in U.S. Patent No. 3,017,187 issued to the present applicant. An improved version of such phonograph may also be found in applicant's application, Serial No. 170,643 filed February 2, 1962, entitled Multiple Speech Phonograph With Improved Tone Arm Mounting, now Patent No. 3,095,201, and the disclosure of said application is hereby incorporated in the present application. This application is a continuation-in-part of applicant's above mentioned application, Serial Number 253,192, filed February 2, 1962. However, to date no phonograph has been developed which is adapted to have the records replaceable thereon and which meet the severe criteria for a phonograph mounted within a toy figure as set forth above.

Consequently, the general object of the present invention is a changeable record phonograph adapted to be located within a toy figure.

Another object of the present invention is a changeable record phonograph adapted to be located in a toy figure and to securely position a record on its turntable irrespective of the orientation of the toy figure by insertion from the side of the turntable through a slot in the toy figure.

Another object of the present invention is a changeable record phonograph adapted to prevent the insertion of another record when a record is positioned on the turntable.

Other objects and advantages of the present invention will be readily apparent from the following description and drawings which illustrate a preferred exemplary embodiment of the present invention, as well as alternative embodiments of the present invention.

In general, the present invention involves a changeable record phonograph which comprises a record support means for rotatably sustaining a record within the body of the toy figure including a rotatable turntable. Also, the phonograph includes a record positioning means for centering a record on said turntable and for retaining said record in such position. Such record positioning means includes a lift bar adapted to be manuualy manipulated externally of the toy figure and to prevent the insertion of a record into the toy figure slot when positioned adjacent to the turntable. Also, it includes a spindle means which is operatively associated with said lifting bar and is adapted to precisely center a record on said turntable, to hold said record in firm contact with said turntable and to be raised by said lifting bar.

In order to facilitate understanding of the present invention, reference will now be made to the appended drawings of several embodiments of the present invention. Such drawings should not be construed as limiting the invention which is properly set forth in the appended claims.

In the drawings:

FIG. 15 is a plan view of the preferred embodiment of the sound reproducing means and tone arm positioning means of the present invention.

Figure 2:
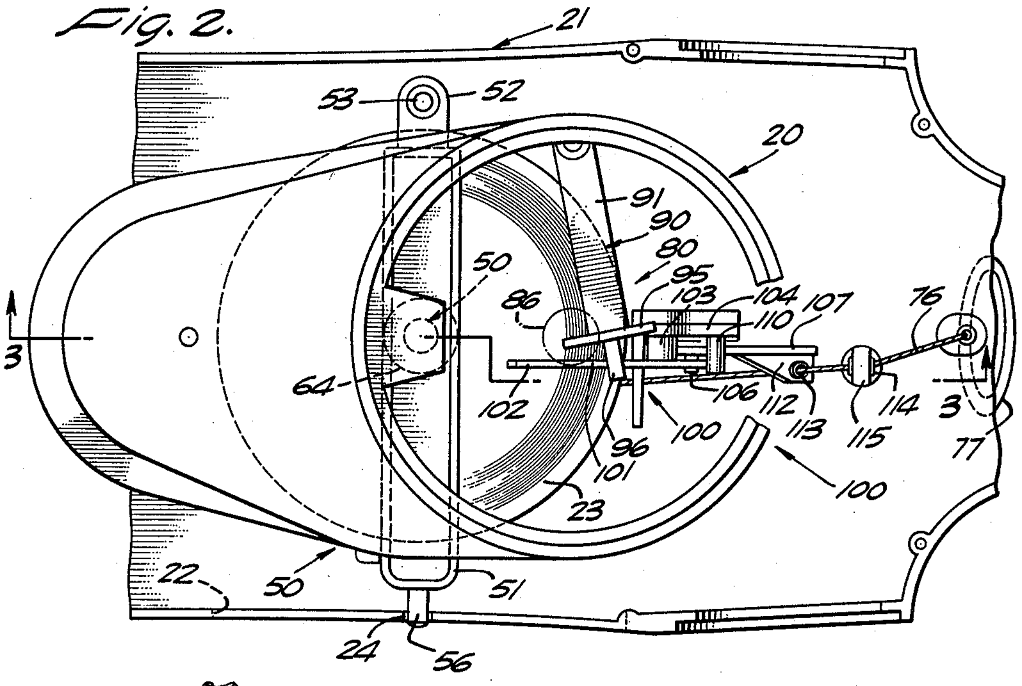
FIG. 2 is a plan view of the phonograph of the present invention.

In general, as illustrated in FIGS. 1–6 and 14, the present invention involves a changeable record phonograph 20 located within a toy figure 21, such as a doll. Such toy figure has a slot 22 through which a record 23 may be inserted into the phonograph 20. The phonograph 20 comprises, in general, (*a*) a record support means 30 for rotatably sustaining a record 23 within the body of a toy figure 21; (*b*) a turntable driving means 40 for rotating the turntable 35 of the record support means 30; (*c*) a record positioning means 50 for centering a record 23 on the turntable 35 and for retaining said record 23 in said position; (*d*) a phonograph energizing means 70 for operating said phonograph; (*e*) a sound reproducing means 80 engageable with a record 23 on said record support means 30; and (*f*) a tone arm positioning means 100 for raising and lowering the tone arm 90 from a record on the turntable and for resetting the tone arm 90 to the rim of the record 23 from the center portion of the record 23.

Figure 14:
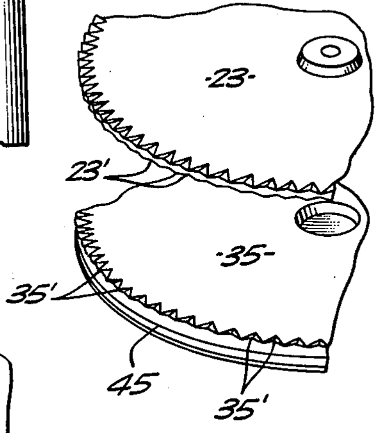
FIG. 14 is a partial view of the preferred turntable and record of the present invention.

The record support means 30 includes a shaft 31 mounted in a post 32 attached to the toy figure 21. Conveniently, such attachment is done by riveting and includes a pair of washers 33 and a shoulder 34 forming an enlarged portion of the shaft 31 above the post 32. Rotatably mounted on the shaft 31 is a turntable 35 having a sleeve portion 36 in slidable contact over the upper portion of the shaft 31. The turntable 35 has a central axial socket 37 which receives a crown 38 on the shaft 31 to hold the turntable 35 on the shaft 31. Preferably, the turntable 35 has a plurality of radial serrations 35′ on its upper surface, as illustrated in FIG. 14. The serrations 35′ are adapted to mate with corresponding serrations 23′ in the lower surface of the record 23 mounted thereon.

The turntable driving means 40 for rotating the turntable 35 includes a spring motor 41 wound around the turntable sleeve 36 with one end connected to the pulley 71. The other end of the spring motor 41 is connected to a post (not shown) attached to the toy figure 21. As set forth below, the spring motor 41 is operatively connected to the turntable 35. A governor 42 for regulating the rate of rotation of the turntable 35 is connected thereto by a driving belt 43. The driving belt 43 is received in a groove 44 around the governor and a groove 45 around the turntable 35 under tension. The governor 42 is mounted and operates in a fashion already described in the aforementioned Ryan U.S. Patent No. 3,017,187.

Figures 3, 4:
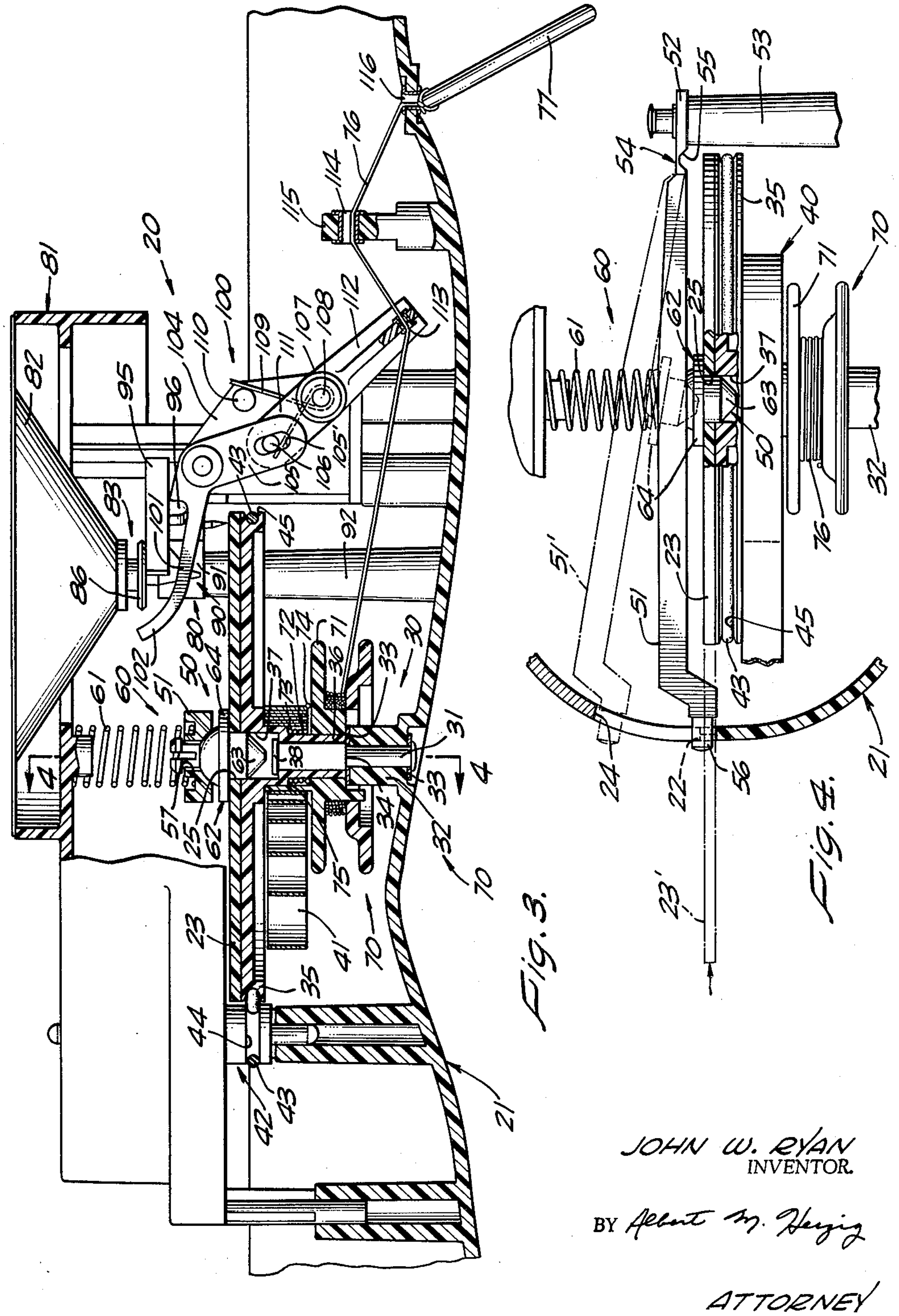
FIG. 3 is the cross-sectional view of a phonograph of FIG. 2 taken along the line 3—3 of FIG. 2 showing the raised position of the tone arm positioning means.
FIG. 4 is a cross-sectional view of FIG. 3 taken along the line 4—4 of FIG. 3.
Figures 7, 8, 9:
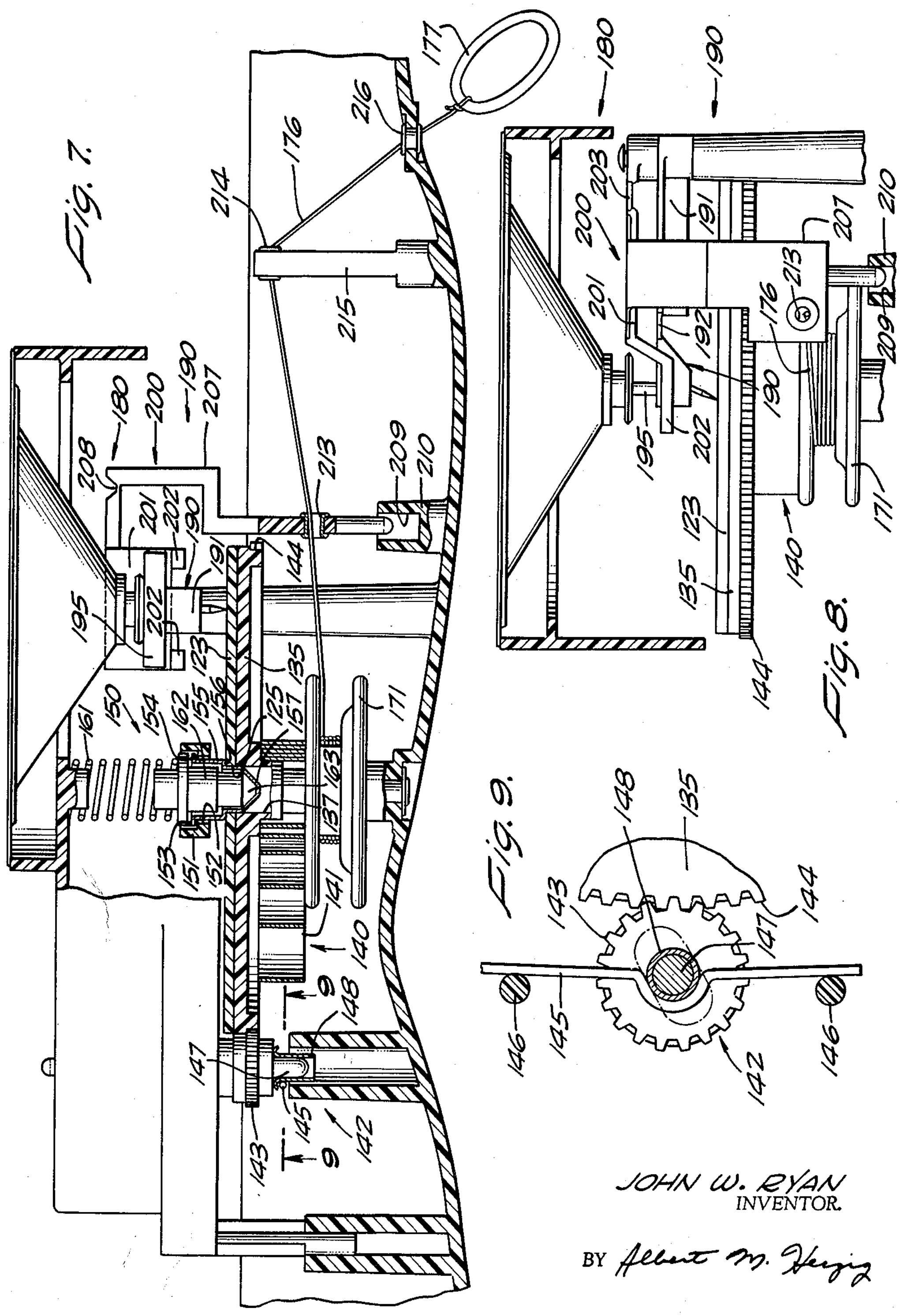
FIG. 7 is a cross-sectional view similar to FIG. 3 of another embodiment of the phonograph of the present invention.
FIG. 8 is an end view of the phonograph of FIG. 7.
FIG. 9 is a cross-sectional view of FIG. 7 taken along the line 9—9 of FIG. 7.
Figure 10:
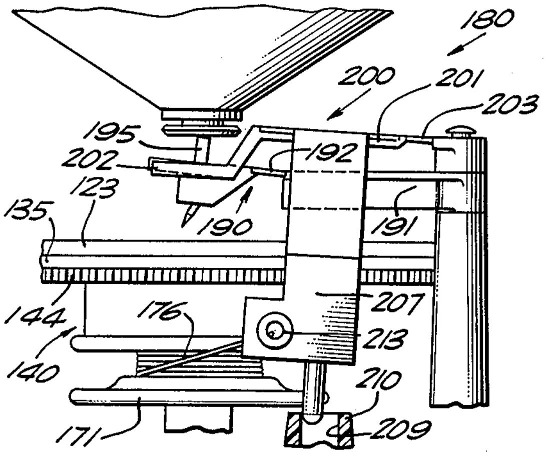
FIG. 10 is a side view of a sound reproducing means and tone arm positioning means of the phonograph illustrated in FIG. 7 showing the raised position of the tone arm positioning means.

The record positioning means 50 for centering the record 23 on the turntable 35 and for retaining the record 23 in such position includes guide means, such as the tone arm mounting post 92 and other posts (not shown), for approximately centering the record 23 on the turntable 35. The record positioning means 50 includes a lifting bar 51 which extends above and diametrically across the turntable 35. The lifting bar 51 is connected at its first end 52 to a lifting bar post 53 which is attached to the toy figure 21. Such connection is adapted to permit the lifting bar 21 to be rotated about the lifting bar post 53 and includes a hinge 54 adapted to permit the lifting bar 51 to be pivoted perpendicular to the turntable 35. Conveniently, the hinge 54 consists of simply a notch 55 in the lifting bar 51 so that when the lifting bar 51 is made out of a flexible material, such as plastic, the lifting bar 51 may be pivoted as described. In addition, the lifting bar 51 has a lug 56 at its second end which extends externally of the toy figure 21 through a slit 24 in the toy figure 21. The slit 24 adjoins the slot 22 in the toy figure and extends perpendicularly thereto so that the lifting bar 51 is adapted to be manually manipulated to be raised and lowered with respect to the turntable 35. The raised position of the lifting bar 51 is illustrated in FIG. 4 in dotted lines as indicated by 51′. Also, the lifting bar 51 is adapted to prevent the insertion of a record 23 into the toy figure 21 in its lowered position adjacent the turntable 35, as illustrated in solid lines in FIG. 4.

A spindle means 60 is operatively associated with the lifting bar 51 and biased into contact therewith by means of a coil spring 61. The spindle means 60 includes a guide 62 which is mounted in an aperture 57 through the lift bar 51 adjacent the axis of the turntable 35. Such mounting adapts the guide 62 to be raised by the lifting bar 51 whereby the coil spring 61 is compacted as illustrated in FIG. 4. The guide 62 has a tapered nose 63 which is adapted to precisely center the record 23 on the turntable 35 when it is inserted in the center hole 25 of the record 23. The nose 63 of the guide 62 extends into the socket 37 of the turntable 35 when the spindle means 60 is in the lowered position as illustrated at FIGS. 3 and 4. The guide 62 also has a shoulder 64 which rests on the upper surface of the central portion of the record 23 when the spindle means 60 is in its lower position. Thus, the guide 62 of the spindle means 60 is adapted to hold the record in firm contact with the turntable 35.

The phonograph energizing means 70 for operating the phonograph 20 includes a pulley 71 rotatably mounted on the shaft 31 over the sleeve 36 of the turntable 35.

The pulley 71 is connected to the spring motor 41 and is adapted to wind up the spring motor 41 when the pulley 71 is rotated in a first direction indicated in FIG. 3. The pulley 71 is operatively connected to the sleeve 36 of the turntable 35 by the clutch means 72. As illustrated in FIG. 3, the clutch means 72 preferably comprises a wire spring 73 helically wound around the sleeve 36 of the turntable 35 with its first end 74 connected to the pulley 71 and its second end 75 being free. This way, the clutch means 72 is adapted to disconnect the pulley 71 from the turntable 35 when the pulley 71 is rotated in said first direction. On the other hand, the pulley 71 is connected to the turntable 35 when the pulley 71 is rotated in a second opposite direction by the unwinding of the spring motor 41. Wound around the pulley 71 is a drawstring 76 which is adapted to rotate the pulley 71 in said first direction when manually pulled externally of the toy figure by means of a ring 77. It should be noted that ring 77 acts as a stop on the drawstring 76 when the tone arm 90 reaches the center portion of the record 23 as set forth below.

Figure 17:
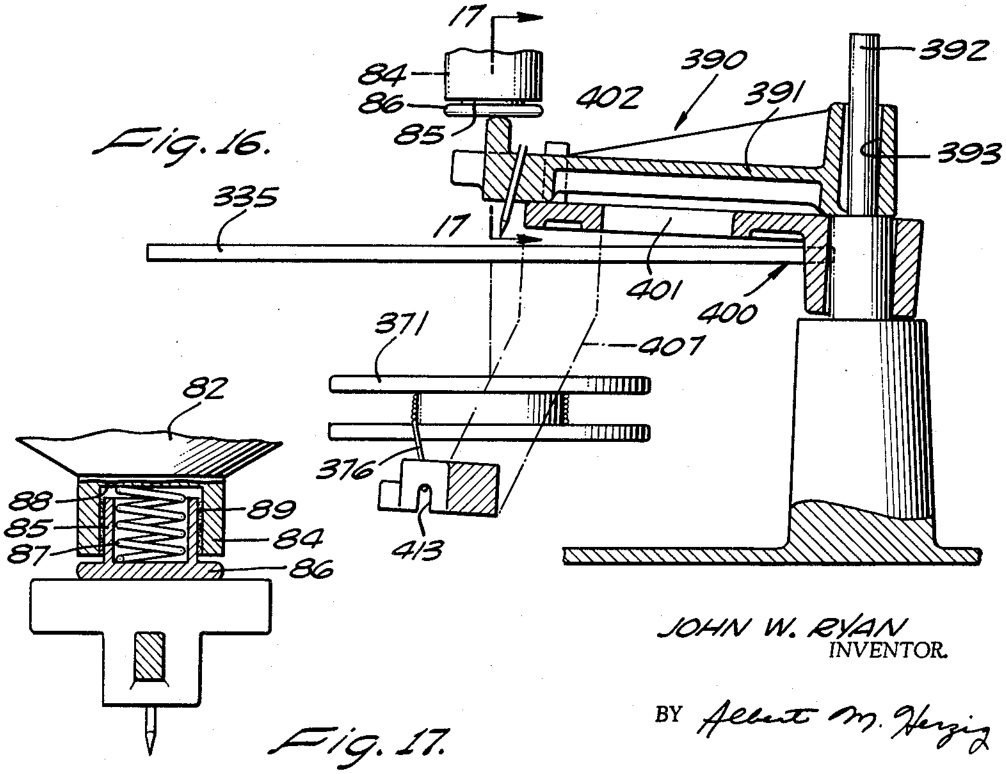
FIG. 17 is a fragmentary sectional detail of the speaker piston mechanism as indicated on the line 17—17 of FIG. 16.

Engageable with the record 23 on the record support means 30 is a sound reproducing means 80. The sound reproducing means 80 includes a speaker means 81 comprising a cone 82 mounted on the toy figure 21 and tone arm connection means 83. The tone arm connection means 83 includes a first tubular member 84 (see FIG. 17) attached to the apex of the cone 82 and slidably receiving a second tubular member 85. The second tubular member 85 extends internally of the first tubular member 84 and terminates in a pad 86. The first tubular member 84 and second tubular member 85 are biased apart by the helical spring 87 abutting against the closed end 88 of the first tubular member 84 and the pad 86 of the tubular member 85. Between the first tubular member 84 and the second tubular member 85 is a silicone grease 89 which dampens the sliding action therebetween. As disclosed in applicant's aforesaid Patent No. 3,095,201, the helical spring permits movement of the tone arm 90 without movement of the speaker means 81 and the silicone grease 89 is adapted to transmit vibrations in the sonic frequency from the tone arm 90 to the speaker means 81.

Figures 1, 5, 6:
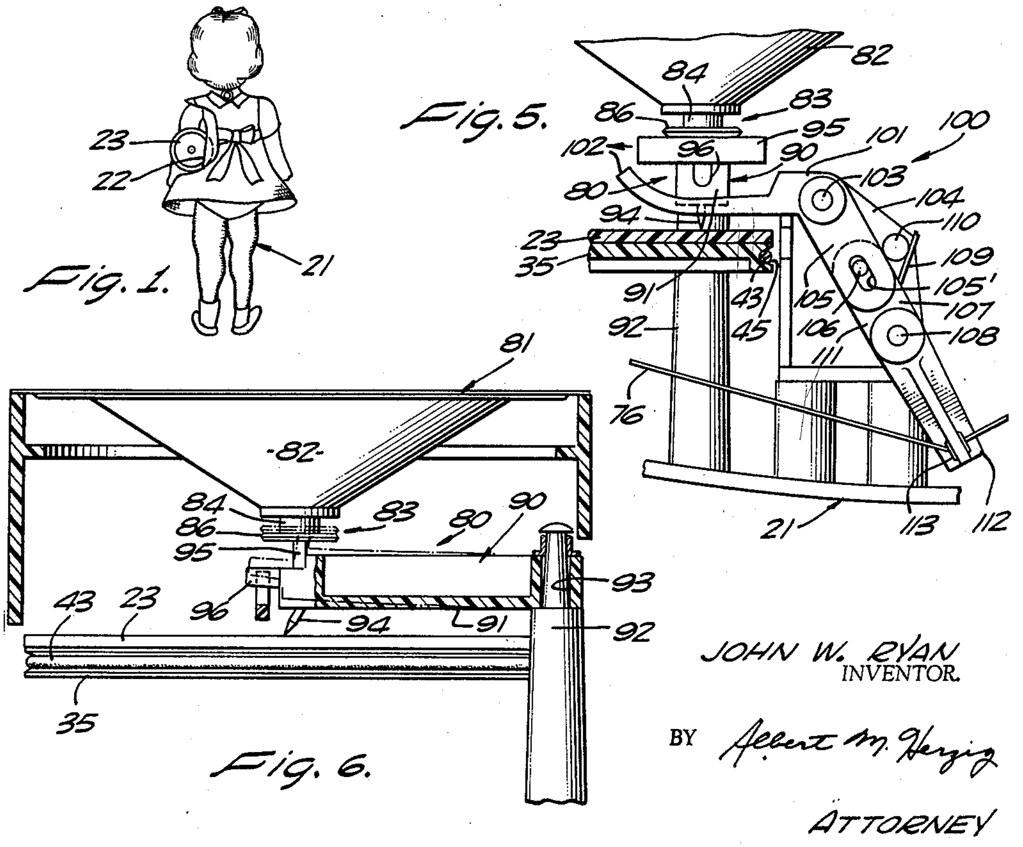
FIG. 1 is a rear view of a toy doll showing a record about to be inserted through a slot in its side.
FIG. 5 is a view of a portion of FIG. 3 showing the lowered position of the tone arm positioning means of FIG. 3.
FIG. 6 is a cross-sectional view of the sound reproducing means portion of the phonograph illustrated in FIG. 2.

Operatively connecting the record 23 on the turntable 35 to the speaker means 81 is a tone arm 90. The tone arm 90 includes a lever 91 pivoted at one end to a tone arm post 92 adjacent to the turntable 35. The lever 91 has a bore 93 therethrough which fits snugly around the tone arm post 92 at its lower end and fits loosely around the arm post 92 at its upper end as illustrated in FIG. 6. Thus the lever 91 is adapted to pivot both parallel and perpendicular to the turntable 35. At the other end of the lever 91, a needle 94 is mounted which contacts the upper surface of the record 23. Above the needle 94 on the lever 91 is a crossbar 95 which slidingly contacts the pad 86 of the second tubular member 85. The crossbar 95 permits the tone arm 90 to move across the surface of the record 23 while maintaining contact with the speaker means 80. Also, lever 91 has a lug 96 adapted to slidingly contact the reset arm 101 of the tone arm positioning means 100 during the operation of the phonograph as set forth below.

Adjacent to the tone arm 90 is a tone arm positioning means 100 for raising and lowering said tone arm from the record 23 on the turntable 35 and for resetting the tone arm 90 to the rim of the record 23 from the central portion of the record 23. As illustrated in FIGS. 1–6, the tone arm positioning means 100 includes a reset arm 101 having an end 102 inclined away from the record 23 so that when the needle 94 of the tone arm 90 reaches the central portion of the rerord 23 it is raised upwardly therefrom by the lug 96 riding on the first end 102 of the reset arm 101. The reset arm 101 is pivoted on an axle 103 which is mounted on a plate 104 so that the reset arm 101 is adapted to rotate in a plane perpendicular to the record 23.

The reset arm 101 has a second end 105 having a slot 105' therein in which is slidably seated a pin 106 mounted on the first end 111 of a lever arm 107. By such connection, rotation of the lever arm 107 in a first direction, as indicated in FIG. 3, causes the first end 102 of the reset arm 101 to rotate away from the record 23 and into contact with the lug 96 of the tone arm 90. The lever arm 107 is rotatably mounted on a second axle 108 mounted on the plate 104 and is adapted to rotate as indicated above. A hairspring 109 is mounted on the second axle 108 of the lever arm 107 and abuts a stop 110 at one end and the pin 106 at the other end. The hairspring 109 is adapted to bias the reset arm 101 and lever arm 107 to rotate in a second opposite direction against the stop 110 so that the first end 102 of the reset arm 101 is normally positioned adjacent to the record 23. The second end 112 of the lever arm 107 has a bore 113 therein through which the drawstring 76 passes. The drawstring 76 extends from the pulley 71 through the bore 113 and then through an eyelet 114 mounted on a post 115, then finally through a grommet 116 in the toy figure 21. However, the bore 113 is displaced from the line connecting the pulley 71 and and the eyelet 114. Consequently, the drawstring 76 is adapted to rotate the lever arm 107 in said first direction when it is externally pulled by means of ring 77.

As clearly shown in FIGS. 1–6, the operation of the phonograph of the present invention is extremely simple. Initially, the tone arm 90 is in a raised position caused by the inclined end 102 of the reset arm 101 as set forth above. A record 23 may then be inserted into the phonograph, as illustrated in FIG. 4, by insertion through the slot 22 while the lifting bar 51 is held in a raised position. After the record 23 is thus approximately positioned or centered on the turntable 35, the spindle means 60 is inserted through its central hole 25 and into the socket 37 of the turntable by the lowering of the lifting bar 51. Thus the spindle means 60 precisely centers the record 23 on the turntable 35 and holds the record 23 in firm contact with the turntable 35.

After the lowering of the lifting bar 51, the drawstring 76 is pulled by means of the ring 77. The tension on the drawstring 76 causes the lever arm 107 to rotate in its first direction and in turn causes the reset arm 101 to rotate in its first direction. Such rotation of the reset arm 101 lifts the tone arm 90 by contacting the lug 96 with its first end 102. The lug 96 of tone arm 90 then slides along the top surface of the first end 102 of the reset arm 101 to reset the tone arm 90 to the rim of the record 23 from the center portion of the record 23 and lower it thereon. Also, the pulling of the drawstring 76 causes the pulley 71 to rotate in its first direction and wind up the spring motor 41. Upon release of the drawstring 76, the turntable 35 is rotated by the spring motor 41 and the needle 94 moves across the record 23 until it is raised by the inclined end 102 of reset arm 101.

Another embodiment of the present invention is illustrated in FIGS. 7–10. In FIGS. 7–10, the phonograph 20 is substantially similar to the phonograph illustrated in FIGS. 1–6 except for the specific changes in the turntable driving means for rotating the turntable, the record positioning means for centering a record on the turntable and for retaining a record in such position, and the tone arm and tone arm positioning means. As illustrated, the turntable driving means 140 regulates the rotation of the turntable 135 by means of a governor 142. However, the governor 142 is operatively connected to the turntable 135 by means of gear teeth 143 on the governor intermeshing with gear teeth 144 on the turntable 135. Contact between said gear teeth is maintained by a spring bar 145 abutting against retaining posts 146 and the shaft 147 of the governor 142. The spring bar 145 actually bears against an eyelet 148 in which the shaft 147 is rotatably mounted so that contact with the spring 145 does not interfere with the rotation of the governor 142.

The record positioning means 150 includes a lifting bar 151 having an aperture 152 therethrough adjacent the axis of the turntable 135. The aperture 152 has a ledge 153 which retains the flange 154 of the cup 155 inserted in the lifting bar 150. The cup 155 has a shoulder 156 which rests on the central portion of the record 123 when the cup 155 is inserted through the central hole 125 of the record 123. Also, the cup 155 has a conical nose 157 which is adapted to precisely center a record 123 on the turntable 135 when it is inserted through the central hole 125 of the record 123 and into the socket 137 of the turntable 135. Similarly, the shoulder 156 is adapted to hold the record 123 in firm contact with the turntable 135. Rotatably mounted in the cup 155 is the guide 162 also having a conical nose 163. Such guide 162 is held in contact with the cup 155 by means of the biasing spring 161. The conical nose 163 of the spindle pin 162 is slightly smaller than the conical nose 157 of the cup 155 so that only the tips of each of said noses are in contact when the lifting bar 151 is positioned adjacent to the turntable 135. Thus, the record 123 is securely retained on the turntable 135 with a minimum of frictional resistance to rotation of the turntable 135. Similar to the lifting bar 51 illustrated in FIG. 4, the lifting bar 151 blocks the record insertion slot of the toy figure when it is positioned adjacent the turntable 135.

In FIGS. 7–10, the sound reproducing means 180 has a tone arm 190 which is adapted to pivot both parallel and perpendicular to the turntable 135. The tone arm 190 includes a lever 191 having a hinge 192 formed simply by molding the lever 191 with a portion having a reduced cross section. The hinge 192 permits the tone arm 190 to pivot perpendicular to the turntable 135. The tone arm positioning means 200 includes a reset arm 201 having a pair of fingers 202 which are adapted to lift the crossbar 195 of the tone arm 190. Also, the lever 201 has a hinge 203 which is adapted to permit the lever 201 to rotate perpendicular to the turntable 135. Similar to the hinge 192 of the lever 191, the hinge 203 may be made simply by reducing the cross section of a portion of the lever 201. The reset arm 201 is connected to the lever arm 207 by a hinge 208 which permits relative movement between the reset arm 201 and a lever arm 207. The lever arm 207 is slidably supported in a groove 209 in a support post 210. Also, the lever arm 207 has an eyelet 213 through which the drawstring 176 passes. The drawstring 176 is wound around the pulley 171, passes through the bore 213, passes through an eyelet 214 in a post 215, and finally through a grommet 216 in the toy figure. The line between the pulley 171 and the eyelet 214 is positioned to pass between the tone arm 190 and the bore 213 in the tone arm positioning means. Consequently, when the drawstring 176 is stretched under tension either by manually pulling of the string 176 or by the motor spring 141 pulling against a stop such as the ring 177 at the end of the string 176 when the tone arm 190 reaches the center portion of the record 123 on the turntable 135, then the drawstring 176 raises the tone arm 190 due to such tension.

The operation of the embodiment illustrated in FIGS. 7–10 is substantially similar to the operation of the embodiment set forth in FIGS. 1–6. However, as noted above, the initial raising of the tone arm 190 is accomplished by tension on the drawstring 176 unlike the operation described for the embodiment illustrated in FIGS. 1–6. Furthermore, the resetting of the tone arm 190 is accomplished by the frictional engagement between drawstring 176 and the bore 213 and the lever arm 207 which causes the tone arm positioning means to reset when the drawstring 176 is pulled externally of the toy figure. During such reset motion, the lever arm 207 is sufficiently movable in the groove 209 of the post 210 to permit the movement of the reset arm 201 from the center portion of the record 23 to its rim because of the hinge 208.

Figure 11:
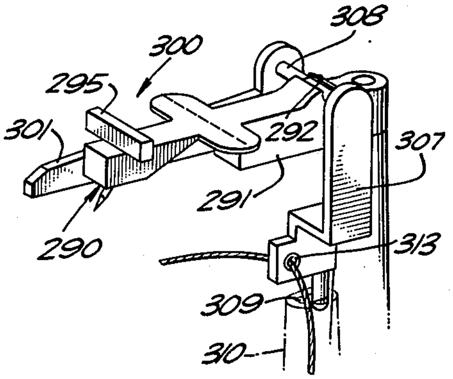
FIG. 11 is a perspective view of another embodiment of the tone arm and tone arm positioning means which may be utilized in the present invention.

Still another embodiment of the tone arm and tone arm positioning means of the present invention is illustrated in FIG. 11. As shown in FIG. 11, the tone arm 290 consists of a lever 291 similar to the lever 191 of FIGS. 7–10 except that it has a groove 292 across its upper surface perpendicular to its longitudinal axis. The tone arm positioning means 300 may then consist of a reset arm 301 in a form of a simple bar which extends underneath the crossbar 295 of the tone arm 290. The reset arm 301 in turn is connected to the lever arm 307 by means of an axle 308 positioned in the groove 292 of the lever 291. The lever arm 307 has a bore 313 through which the drawstring 276 passes and such bore 313 is positioned as described for bore 213 of the lever arm 207 in FIGS. 7–10. Similarly, the lever arm 307 is freely positioned in a groove 309 of the post 310. The operation of the tone arm and tone arm positioning means illustrated in FIG. 11 is substantially the same as the embodiment shown in FIGS. 7–10.

Figure 12:
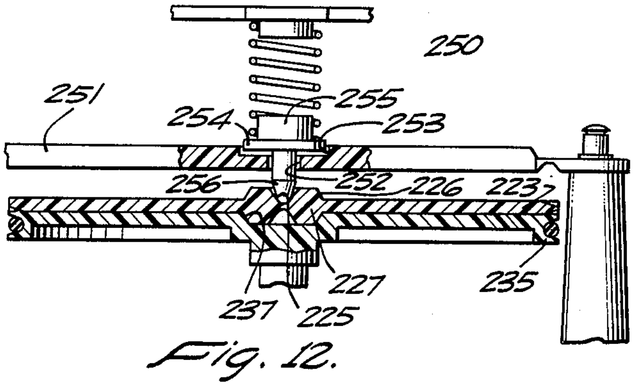
FIG. 12 is a cross-sectional view of another embodiment of the record positioning means of the present invention.
Figure 13:
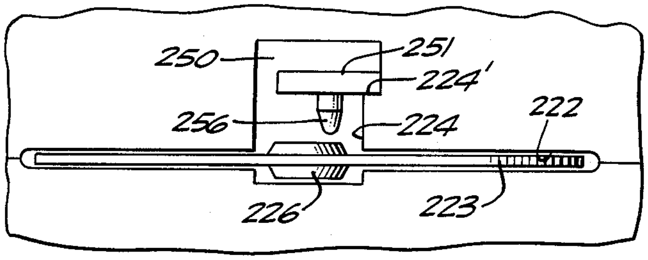
FIG. 13 is an end view of a record positioning means illustrated in FIG. 12.

Another embodiment of the record positioning means 250 is illustrated in FIGS. 12 and 13. As illustrated in FIGS. 12 and 13, the record positioning means 250 comprises a lifting bar 251 having an aperture 252 therethrough adjacent the axis of the turntable 235. The aperture 252 has a surrounding recess 253 in which is received the shoulder 254 of the spindle pin 255. The spindle pin 255 also has a nose 256 which extends through the aperture 252 and is received in a mating recess 225 in a ridge 226 of the record 223. In turn, the record 223 has a lower ridge 227 which is received in a recess 237 of the turntable 235. The operation of the record positioning means 250 illustrated in FIGS. 12 and 13 is substantially the same as that illustrated of the record positioning means 150 illustrated in FIGS. 7–10. However, it should be noted that the lifting bar 251 may be held in a position removed from the turntable 235 by placing it on the ledge 224′ of the vertical slot 224. As before, the record 223 may be inserted through the horizontal slot 222.

Figure 16:
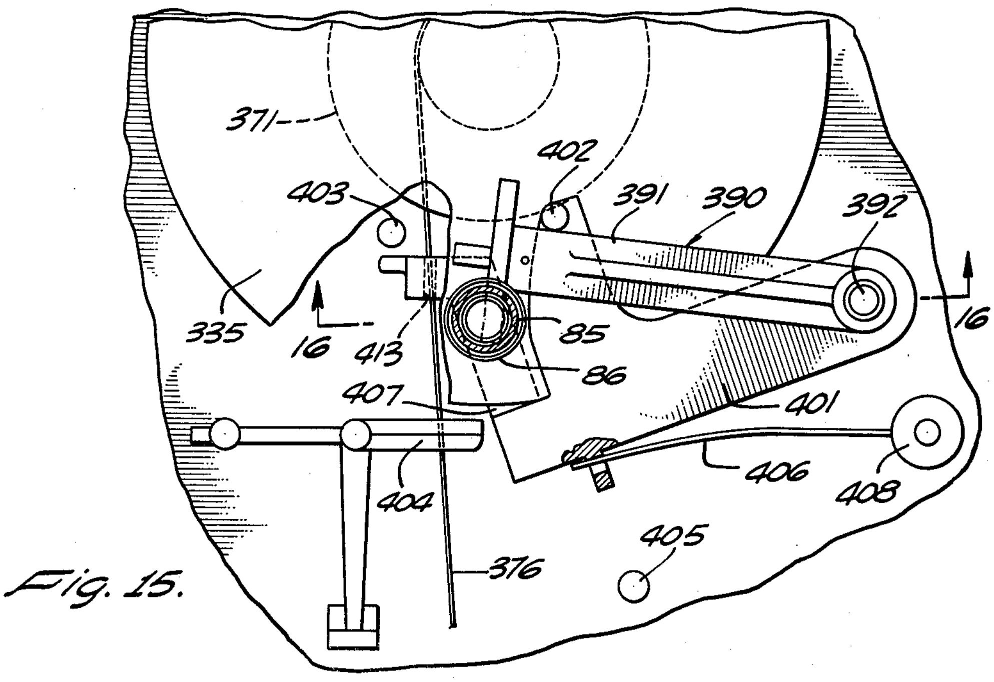
FIG. 16 is a cross-sectional view of FIG. 15 taken along the line 16—16 of FIG. 15.

Finally, the preferred embodiment of the tone arm and tone arm positioning means of the present invention is illustrated in FIGS. 15 and 16. In FIGS. 15 and 16, the tone arm 390 includes a simple lever 391 pivoted on a post 392 by means of a bore 393. As described above, the bore 393 fits snugly about the post 392 at its lower end and loosely at its upper end so that the lever 391 may be pivoted both parallel and perpendicular to the record 335. The tone arm positioning means 400 consists of simply a reset arm 401 similarly pivoted about the post 392 and having a lever arm 407 dependent therefrom. At the lower end of the lever arm 407 is a groove 413 through which the drawstring 376 passes from the pulley 371. The operation of the tone arm and tone arm positioning means 400 is substantially the same as set forth above for the embodiment disclosed in FIGS. 7–11. However, the motion of the tone arm 390 toward the central portion of the record 335 is limited by the stop 402 on the reset arm 401. Also, the similar motion of the tone arm positioning means is limited by the stop 403 which strikes the lever arm 407. The opposite movement of the tone arm is limited by the stop 404. Similarly, the tone arm positioning means is limited by the stop 405. The stop 405 is adapted to stop the outward rotation of the tone arm 390 slightly before stopping of the tone arm positioning means 400 by stop 405. Preferably, the tone arm positioning means is biased and moved inwardly toward the record 335 by the spring 406 mounted on post 408.

Several embodiments of the present invention have been illustrated and many other specific embodiments of the present invention will be obvious to those skilled in the art in view of this disclosure. For example, any suitable friction means may be utilized to maintain the constant position of the record on the turntable. Thus, instead of the serrations 35′ and 23′, simply roughened surfaces may be utilized. Also, the lift bar need not extend diametrically across the turntable so long as it is adapted to properly raise the spindle means. Likewise, it is preferable that the lifting bar have an aperture therethrough adjacent the axis of a turntable since this permits a reduction in the frictional resistance to the rotation of the turntable by the spindle means; however, the spindle means may be adapted to utilize a solid lifting bar. Also, the clutch means may be eliminated so that the turntable is rotated during the winding up of a spring motor; however, such design has been found to produce inferior operation.

There are many features of the present invention which clearly show the significant advance the present invention represents over the prior art. Consequently, only a few of the more outstanding features will be pointed out to illustrate the unexpected and unusual results obtained by the present invention. One feature of the present invention is a changeable record phonograph to be used in toy figures which is simple, compact and durable. Another feature of the present invention is the utilization of a lifting bar to securely position records on the phonograph turntable irrespective of orientation of the doll figure while permitting such records to be changed. Still another feature of the present invention is the utilization of a lifting bar to prevent the insertion of another record when a record is already in place on the turntable.

It will be understood that the foregoing description and examples are only illustrative of the present invention and it is not intended that the invention be limited thereto. All substitutions, alterations and modifications of the present invention which come within the scope of the following claims or to which the present invention is readily susceptible without departing from the spirit and scope of this disclosure are considered part of the present invention.

I claim:

1. A toy figure having a hollow body with a phonograph device therein; having a turntable for supporting and rotating a record; a slot in said body, substantially in a plane containing said turntable but outwardly of the periphery of said turntable; means in said body for guiding a record inserted edgewise through said slot into approximately concentric relation to said turntable; a lifting bar extending across said turntable and pivoted at one end to said device for pivotal movement perpendicular to said turntable, the other end of said lifting bar extending outwardly of said body adjacent said slot; said body having an opening therein through which said other end extends and being of a size and shape to permit said pivotal movement of said lifting bar; centering means mounted on said lifting bar intermediate the ends thereof and adjacent the center of said turntable and being engageable with the center of a record to accurately center the same on said turntable; spring means urging said centering means toward said turntable to hold said record securely thereagainst; and means fixedly carried by said other end of said lifting bar and which extends across and blocks said slot when said centering means is in engagement with said record, and which moves with said lifting arm to unblock said slot when said arm and centering means are swung away from said turntable.

2. A toy figure having a hollow body with a phonograph device therein; said phonograph device having a turntable for supporting and rotating a record; a slot in said body, substantially in a plane containing said turntable but outwardly of the periphery of said turntable; means in said body for guiding a record inserted edgewise through said slot into approximately concentric relation to said turntable; a lifting bar extending across said turntable and pivoted at one end to said device for pivotal movement perpendicular to said turntable, the other end of said lifting bar extending outwardly of said body adjacent said slot; said body having an opening therein through which said other end extends and being of a size and shape to permit said pivotal movement of said lifting bar; centering means mounted on said lifting bar intermediate the ends thereof and adjacent the center of said turntable and being engageable with the center of a record to accurately center the same on said turntable; spring means urging said centering means toward said turntable to hold said record securely thereagainst; and means fixedly carried by said other end of said lifting bar and which extends across and blocks said slot when said centering means is in engagement with said record, and which moves with said lifting arm to unblock said slot when said arm and centering means are swung away from said turntable, said opening being provided with an edge configured to define a shoulder adapted to engage said lifting arm and releasably hold the same when swung in a direction away from said slot.

3. A toy figure having a hollow body with a phonograph device therein; said phonograph device having a turntable for supporting and rotating a record; a slot in said body, substantially in a plane containing said turntable but outwardly of the periphery of said turntable; means in said body for guiding a record inserted edgewise through said slot into approximately concentric relation to said turntable; a lifting bar extending across said turntable and pivoted at one end to said device for pivotal movement perpendicular to said turntable, the other end of said lifting bar extending outwardly of said body adjacent said slot; said body having an opening therein through which said other end extends and being of a size and shape to permit said pivotal movement of said lifting bar; centering means mounted on said lifting bar intermediate the ends thereof and adjacent the center of said turntable and being engageable with the center of a record to accurately center the same on said turntable; spring means urging said centering means toward said turntable to hold said record securely thereagainst; and means fixedly carried by said other end of said lifting bar and which extends across and blocks said slot when said centering means is in engagement with said record, and which moves with said lifting arm to unblock said slot when said arm and centering means are swung away from said turntable, said opening being provided with an edge configured to define a shoulder adapted to engage said lifting arm and releasably hold the same when swung in a direction away from said slot, said lifting arm being mounted for further swinging movement generally parallel to said slot for selective engagement with and release from said shoulder.

4. A toy figure having a hollow body with a phonograph device therein; said phonograph device having a turntable for supporting and rotating a rocord; a slot in said body, substantially in a plane containing said turntable but outwardly of the periphery of said turntable; means in said body for guiding a record inserted edgewise through said slot into approximately concentric relation to said turntable; a lifting bar extending across said turntable and pivoted at one end to said device for pivotal movement perpendicular to said turntable, the other end of said lifting bar extending outwardly of said body adjacent said slot; said body having an opening therein through which said other end extends and being of a size and shape to permit said pivotal movement of said lifting bar; centering means mounted on said lifting bar intermediate the ends thereof and adjacent the center of said turntable and being engageable with the center of a record to accurately center the same on said turntable; spring means urging said centering means toward said turntable to hold said record securely thereagainst; and means fixedly carried by said other end of said lifting bar and which extends across and blocks said slot when said centering means is in engagement with said record, and which moves with said lifting arm to unblock said slot when said arm and centering means are swung away from said turntable, said centering means comprising a spindle mounted on said lifting arm for lateral movement thereon; said spring means urging said spindle toward said turntable.

5. A toy figure having a hollow body with a phonograph device therein; said phonograph device having a turntable for supporting and rotating a record; a slot in said body, substantially in a plane containing said turntable but outwardly of the periphery of said turntable; means in said body for guiding a record inserted edgewise through said slot into approximately concentric relation to said turntable; a lifting bar extending across said turntable and pivoted at one end to said device for pivotal movement perpendicular to said turntable, the other end of said lifting bar extending outwardly of said body adjacent said slot; said body having on opening therein through which said other end extends and being of a size and shape to permit said pivotal movement of said lifting bar; centering means mounted on said lifting bar intermediate the ends thereof and adjacent the center of said turntable and being engageable with the center of a record to accurately center the same on said turntable; spring means urging said centering means toward said turntable to hold said record securely thereagainst; and means fixedly carried by said other end of said lifting bar and which extends across and blocks said slot when said centering means is in engagement with said record, and which moves with said lifting arm to unblock said slot when said arm and centering means are swung away from turntable, said centering means comprising a spindle mounted on said lifting arm for lateral movement thereon; said spring means urging said spindle toward said turntable, said lifting arm being provided with an opening therethrough; said spindle extending loosely therethrough and having a shoulder engageable by said bar when swung in a direction away from said turntable.

6. A toy figure having a hollow body with a phonograph device therein; said phonograph device having a turntable for supporting and rotating a record; a slot in said body, substantially in a plane containing said turntable but outwardly of the periphery of said turntable; means in said body for guiding a record inserted edgewise through said slot into approximately concentric relation to said turntable; a lifting bar extending across said turntable and pivoted at one end to said device for pivotal movement perpendicular to said turntable, the other end of said lifting bar extending outwardly of said body adjacent said slot; said body having an opening therein through which said other end extends and being of a size and shape to permit said pivotal movement of said lifting bar; centering means mounted on said lifting bar intermediate the ends thereof and adjacent the center of said turntable and being engageable with the center of a record to accurately center the same on said turntable; spring means urging said centering means toward said turntable to hold said record securely thereagainst; and means fixedly carried by said other end of said lifting bar and which extends across and blocks said slot when said centering means is in engagement with said record, and which moves with said lifting arm to unblock said slot when said arm and centering means are swung away from said turntable, a speaker and tone arm having a portion movable across a record on said turntable; a first member fixed to said speaker; a second member movably carried by said first member adjacent said tone arm; spring means between said members and biasing said second member into sliding engagement with said tone arm; and further yieldable means between said members for transmitting sonic vibrations from said second member to said first member.

7. A phonograph device comprising: a turntable for supporting and rotating a record; a speaker on said device; a tone arm having a portion movable across a record on said turntable; a first member fixed to said speaker; a second member movably carried by said first member adjacent said tone arm; one of said members telescopically embracing the other; spring means between said members and biasing said second member into sliding engagement with said tone arm; and further yieldable means between the adjacent surfaces of the telescoped portions of said members for transmitting sonic vibrations from second member to said first member; said further yieldable means comprising a semi-solid silicone material.

References Cited in the file of this patent

UNITED STATES PATENTS

| | | |
|---|---|---|
| 1,167,838 | Prout | Jan. 11, 1916 |
| 1,912,291 | McDermott | May 30, 1933 |
| 2,538,392 | Somers | Jan. 16, 1951 |
| 2,809,843 | Mueller | Oct. 15, 1957 |
| 2,939,713 | Winter | June 7, 1960 |
| 3,000,005 | Moyer | Sept. 12, 1961 |
| 3,017,187 | Ryan | Jan. 16, 1962 |
| 3,073,605 | Mennie | Jan. 15, 1963 |
| 3,095,201 | Ryan | June 25, 1963 |

FOREIGN PATENTS

| | | |
|---|---|---|
| 28,223 | France | Jan. 26, 1925 |
| 322,884 | Great Britain | Dec. 19, 1929 |